United States Patent [19]

Sierpinski et al.

[11] Patent Number: 4,685,812
[45] Date of Patent: Aug. 11, 1987

[54] PROBE FOR THE DETERMINATION OF THE TEMPERATURES OF THE WALLS OF COKE OVEN FLUES

[75] Inventors: Hervé Sierpinski, Nancy; Jean Philippe, Veckring, both of France

[73] Assignee: IRSID, Saint-Germaine-en-Laye, France

[21] Appl. No.: 807,083

[22] Filed: Dec. 10, 1985

[30] Foreign Application Priority Data

Dec. 10, 1984 [FR] France ................. 84 18822

[51] Int. Cl.$^4$ .............. G01K 1/08; G01K 13/00; G01J 5/04
[52] U.S. Cl. .................. 374/132; 374/136; 374/137; 202/270; 266/87
[58] Field of Search ............. 374/132, 136, 139, 140, 374/130, 137, 149; 356/43, 44, 45; 266/87; 201/1, 41; 202/270, 151

[56] References Cited

U.S. PATENT DOCUMENTS

| | | | |
|---|---|---|---|
| 2,646,681 | 7/1953 | Walton | 266/87 |
| 3,364,745 | 1/1968 | Fetner et al. | 374/140 |
| 3,463,005 | 8/1969 | Hance | 266/87 |
| 3,501,380 | 3/1970 | Perch | 374/125 |
| 3,506,542 | 4/1970 | Kulakoy | 201/1 |
| 3,577,784 | 5/1971 | Kovack | 374/125 |
| 4,093,193 | 6/1978 | Cassidy et al. | 266/87 |
| 4,402,790 | 9/1983 | Lynn et al. | 201/1 |
| 4,452,538 | 6/1984 | Reger et al. | 356/43 |
| 4,468,009 | 8/1984 | Clauss et al. | 374/140 |
| 4,573,805 | 3/1986 | Savage et al. | 374/122 |

Primary Examiner—Steven L. Stephan
Assistant Examiner—Thomas B. Will
Attorney, Agent, or Firm—Pollock, Vande Sande & Priddy

[57] ABSTRACT

Probe for determining the temperatures of the walls of coke oven flues, including an optical pyrometer suspended by a metallic rope from a manipulating device including a drum on which the rope is coiled and uncoiled. The pyrometer is contained in an insulating sleeve of refractory material, and the rope is surrounded by a sheath which is wetted before the measurement takes place, in order to prevent an unacceptable temperature rise during the brief measurement period required. Due to this arrangement, conventional cooling apparatus is eliminated.

5 Claims, 2 Drawing Figures

PROBE FOR THE DETERMINATION OF THE TEMPERATURES OF THE WALLS OF COKE OVEN FLUES

FIELD OF THE INVENTION

The invention relates to the determination of the temperatures of the walls of coke oven flues by means of a probe comprising a measuring head which includes a pyrometer and is suspended within the flue by a connection to a device for manipulating the probe, such device being situated outside the flue.

BACKGROUND OF THE INVENTION

Accordingly, the invention does not relate to probes the photosensitive element of which (pyrometer or other) remains outside the oven, at one end of either a rigid and straight rod, the other end of which accommodates a deflecting mirror situated in front of an open window facing the walls of the flues (U.S. Pat. No. 3,577,784), or of a flexible element shielding one or more optical fibres terminating laterally at the other end, within the oven (U.S. Pat. No. 4,402,790).

In a first embodiment of a known probe of the type according to the invention, the optical pyrometer is enclosed in a jacket which is cooled by internal circulation of water or the like. This jacket constitutes the measuring head and is placed at the end of a rigid rod manipulated by a rack system. This embodiment forms an assembly which is heavy, bulky, difficult to manipulate and expensive and which is, in addition, liable to interfere with the measurement as a result of the presence of a large thermal mass.

In a second type of known probe, the rigid rod has been replaced by a flexible metal tube which can be coiled and which conducts the cooling water to the head. This system has the disadvantage of being fragile, in particular due to the risks of breaking out the flexible tube.

Until now, by reason of the high temperatures prevailing within the flues and in view of the fact that optical pyrometers do not withstand a temperature exceeding 60° C., those skilled in the art have always considered it essential to provide cooling of the head by internal circulation of fluid (in general, water).

The inventors have recognized that it was possible to dispense with such cooling by circulation of water which, if effective, nevertheless created serious restraints. They have discovered that it is possible to design a simple apparatus permitting successive operations of inspection of each flue which are sufficiently rapid to dispense with an elaborate cooling system.

OBJECT OF THE INVENTION

Thus, the object of the invention is a probe in which the measuring head containing an optical pyrometer is constituted by a sleeve which is not cooled and which is constructed of refractory material (reinforced fibrous material or compact refractory brick), in which the connection is constituted by a metallic rope (especially steel rope) surrounded by a flexible sheath of fibrous refractory material, and in which a device is provided for manipulating said head comprising a drum for coiling the connection.

SUMMARY OF THE INVENTION

In a preferred embodiment, the manipulating device further comprises means for moistening the sheath of the connecting rope, for example a spraying head, a water container surrounding the sheath, or preferably a water trough enveloping the lower part of the drum.

The whole constitutes a device which is very flexible, which occupies little space and which is light. The protection system is sufficient for exploration for a period of about one minute within the flue. Trials have confirmed that this brief measurement period is sufficient for the exploration of a flue with the aid of the probe of the invention.

BRIEF DESCRIPTION OF THE DRAWING

Further advantages and characteristics of the invention will appear on reading the description which follows and which is given with reference to the accompanying drawings, in which.

DETAILED DESCRIPTION

Figure 1:
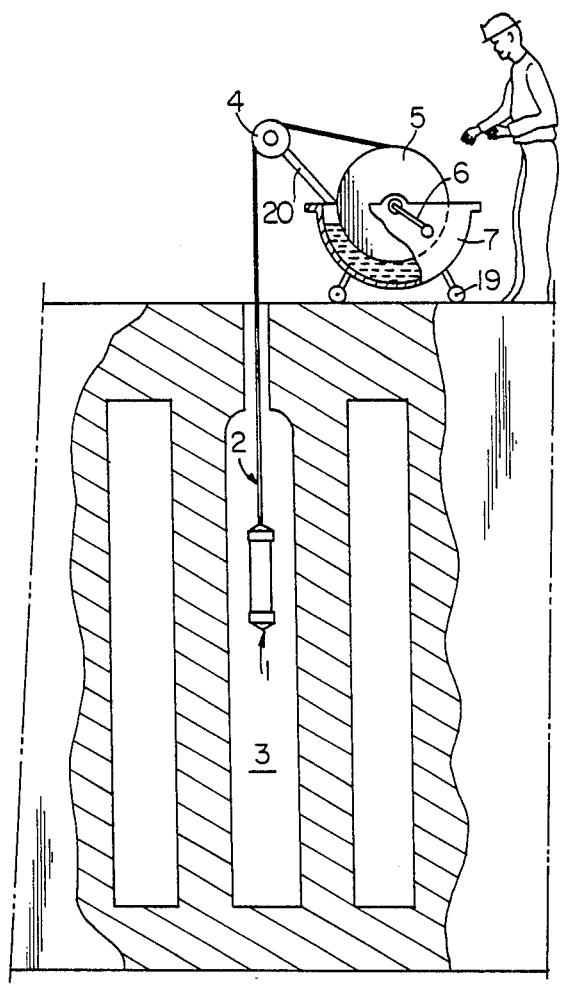
FIG. 1 shows a section of a part of a coke oven battery with the device according to the invention in its embodiment and including a water trough.
Figure 2:
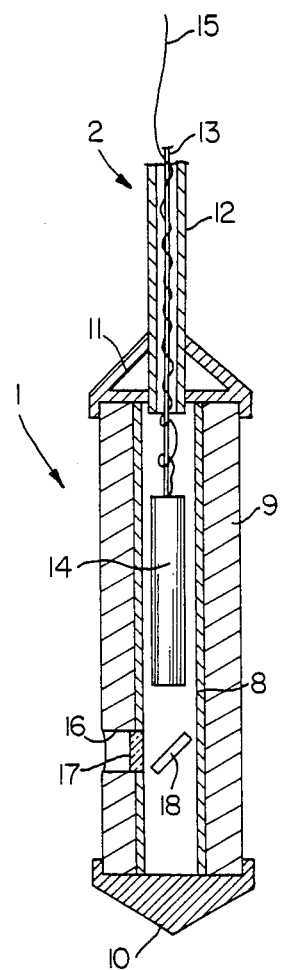
FIG. 2 shows a detail in section, of the measuring head.

The measuring head 1 is suspended by its flexible connection 2, and penetrates the interior of the flue 3 through the upper opening. The flexible connection 2 passes around a guide pulley 4 and is coiled on a drum 5, the rotation of which is controlled by means symbolized by the crank 6.

The lower part of the drum 5 is immersed in a semicylindrical trough 7 filled with water, in such a manner as to wet the connection 2. This trough is mounted on casters 19 and serves as a mounting for the arms 20 supporting the pulley 4.

The measuring head 1 comprises an insulating sleeve constituted by a steel tube 8 (in order to increase resistance to mechanical shocks) covered by a fibrous material 9 (for example that marketed under the trade mark KERLANE ®). The sleeve may alternatively be constructed of compact refractory material (for example bricks marketed under the trade mark CALOR ®), in order to increase its thermal capacity, should this be desired.

This sleeve is closed at its lower part by a ballasting member 10 which is constructed of refractory stainless steel and which is affixed to the refractory 9, and at its upper part by a securing element 11 which is constructed of the same metal and which permits the connection between the sleeve 8,9 and the sheath 12 of the connection 2, and which is likewise affixed to the refractory part 9 of the sleeve.

This flexible sheath 12 is braided and made from reinforced fibrous material (for example that marketed under the trade mark DELCERAM ®). It surrounds a steel anti-torsion rope 13, at the end of which there is suspended an optical pyrometer 14 which is of extended form (pyrometer of the "pencil" type) and which is protected within the sleeve 8,9. The sheath also shields the electrical connections 15 which are necessary for the supply of current and for the transmission of the signals supplied by the pyrometer to a conventional receiving and recording apparatus, which is not shown and which is situated on the probe manipulating structure 4-7.

The optical pyrometer 14 receives the infrared radiation through an aperture 16 in the sleeve which is provided with a window 17 made of sapphire, and a deflecting mirror 18.

The trials carried out by the inventors have shown that the system for uncoiling and coiling the connection 2 permits exploration of the entire height of a flue four meters in length in twenty seconds (the response time of the pyrometer itself being instantaneous). The steel band 13, protected by the fibrous material 12, performs satisfactorily, even after repeated relatively long dwell times in the flame (1 minute, or even more than 2 minutes in the event of prior moistening of the sheath 12).

The development of the temperatures at the heart of the measuring probe shows that after one minute the temperature has risen only slightly (a change of less than 15° C.) for the two types of sleeve insulation. As the "pencil" pyrometer can operate up to a maximum temperature of 60° C., it is seen that the exploration of the flue proves to be perfectly feasible within the prescribed periods of time. It will be noted that the thermal inertia may cause the rise in temperature of the head to continue after the latter has been withdrawn from the flue. In this case, it is possible to provide an associated device for cooling the head at the outlet of the flue.

The immersion trough may be replaced by any other means for moistening of the sheath outside the flues, for example, a distributor spraying the drum along a generatrix, the excess water being collected by gravity in a collecting vessel below the drum and recirculated in the spray distributor. Likewise, it is possible to provide a water container surrounding the sheath 12 at the outlet of the drum and preferably in a vertical position, i.e., below the guide pulley 4.

Moreover, the manipulating device may be to a large extent mechanized. In particular, the crank 6 may be replaced by a reversible electric motor.

What is claimed is:

1. Probe for determining the temperatures of walls of coke oven flues, comprising a measuring head (1) housing an optical pyrometer (14) for measuring the temperature of the walls of the coke oven flues, said pyrometer being suspended by connecting means (2) from a device (4-7) for manipulating said measuring head, said measuring head being constituted by an insulating sleeve (8,9) of uncooled refractory material, said connecting means being constituted by a metallic rope surrounded by a flexible sheath (12) of fibrous refractory material, and said manipulating device comprising a drum (5) for rapidly coiling and uncoiling said connecting means for exploration of the entire length of said flue in a short time, said refractory material of said insulating sleeve being of a thickness sufficient to protect said pyrometer from overheating during said short time said measuring head is exploring said flue.

2. A probe according to claim 1, wherein said sleeve has a lateral window (17), and comprising an internal mirror (18) facing said window to direct infrared radiations from said walls through said window to said pyrometer.

3. A probe according to claim 2, wherein said window is constructed of sapphire.

4. A probe according to claim 1, wherein said manipulating device further comprises means for moistening said sheath before the sheath is led into said flue.

5. A probe according to claim 4, wherein said moistening means comprises a water trough (7) in which a lower part of said drum (5) is immersed in such manner as to wet said connecting means.

* * * * *